Nov. 2, 1943.  C. G. HIGGINS  2,333,569

FOLDED MAP, PLAN, AND CHART

Filed Sept. 10, 1941

INVENTOR
Charles Gauntlett Higgins
BY
Munn, Liddy, Glaccum & Kane.
ATTORNEYS

Patented Nov. 2, 1943

2,333,569

UNITED STATES PATENT OFFICE 2,333,569

FOLDED MAP, PLAN, AND CHART

Charles Gauntlett Higgins, London, England

Application September 10, 1941, Serial No. 410,235
In Great Britain September 20, 1940

4 Claims. (Cl. 281—5)

This invention relates to folded maps, plans and charts.

In their present form folded maps, plans and charts (hereinafter called maps to save repetition) are so arranged that to cover a large portion of the map it is necessary to open it to its full extent. Some sectional maps can be so folded that a long horizontal strip can be seen by folding in concertina form and opening two sections at a time but if the map has more than two sections in depth it must be opened out to its full extent and refolded to pass from one section to a section above or below it.

According to the present invention from one aspect a map is so folded that the whole surface can be viewed in sections without opening the map to a size greater than one section.

The invention is particularly applicable for use in aircraft. In this case room for opening out a folded map and refolding is restricted; moreover, long distances are quickly covered so that change from one section of the map to the next is frequently necessary.

According to the invention from another aspect a map is divided into rectangular sections, preferably square, and these are folded about their edges and about their diagonals and packed together by a combination of edge and diagonal folds so that the whole map comes successively into view by folding about a diagonal and turning through ninety degrees.

I will now explain in detail the manner in which the simple case of a map of six sections is folded in accordance with my invention.

In the accompanying drawing.

Figure 1:
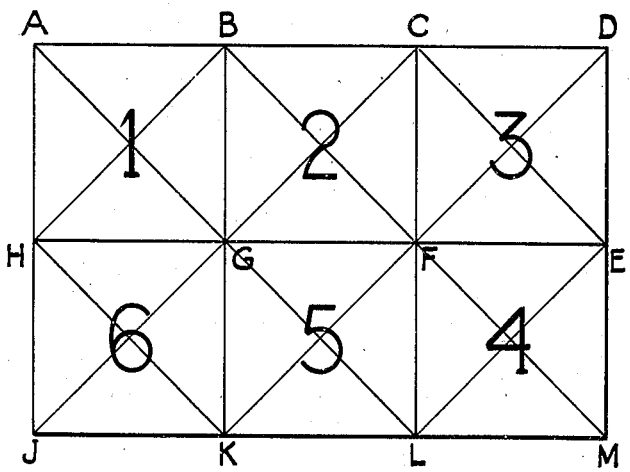
Fig. 1 represents a map of six square sections 1 to 6.
Figure 2:
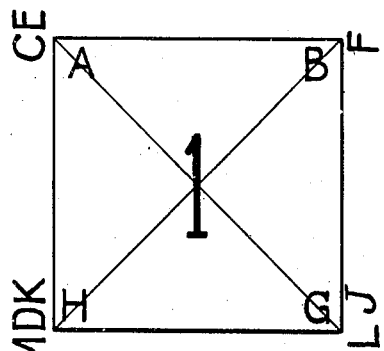
Fig. 2 shows the map as folded with section 1 visible.
Figure 3:
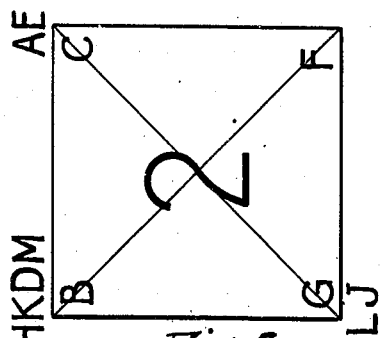
Fig. 3 shows the map folded over from the position of Fig. 2 to make section 2 visible.

In Figs. 2 and 3 the reference letters outside the squares represent the corners lying behind the corners shown inside the squares.

Referring to these drawings the map is first creased about the diagonals HK, AGL, BFM, and CE and then creased about the diagonals HB, JGC, KFD and LE.

The map is now folded in the following manner:

Bend along diagonals AG and CG, bringing points A and C together with point B standing outwards; next bend along diagonals JG and LG, bringing the points J and L together with the point K standing outwards.

Next bend along diagonal FD, bringing points C and E together, with point D standing inwards. Then bring points K and H together by bending along diagonals JG; then bend inwardly along the diagonal FM bringing points L and E together; then bring points F and B together by bending along the diagonal CG; then bring points L and G together by folding about diagonal KF, and flatten out.

The parts are then in the position shown in Fig. 2 and square 4 is underneath.

To bring the whole map into view, starting from the position of Fig. 2, the following folds and turns are now made:

(a) Fold over along the line AG placing point B over point H, thus bringing the section 2 in the position shown in Fig. 3; twist clockwise through 90 degrees.

(b) Fold over along the line BF placing point C over point G and twist clockwise through 90 degrees; this exposes section 3.

(c) Turn upside down about edge CD; this exposes section 4.

(d) Fold over along the line FM placing point L over point E and twist clockwise through 90 degrees; this exposes section 5.

(e) Fold over along the line GL placing point K over point F and twist clockwise through 90 degrees; this exposes section 6.

The folding for maps having a larger number of square sections than six can be carried out in a similar manner by successively folding about sides and diagonals until the final map of the size of one section is obtained that can be fully studied solely by folding about diagonals and turning the map through ninety degrees.

The invention is not restricted to the details above described but inclues all arrangements and modifications coming within the ambit of the claims which follow.

I claim:

1. A map divided into rectangular sections and having a plurality of sections in one direction and a plurality of sections in a direction at right angles thereto so folded in a pack that the whole surface of the map can be viewed in sections without opening the map to the extent of more than one section by successive folding about diagonals of rectangular sections turning angularly and turning the pack upside down.

2. A map divided into square sections and having a plurality of sections in one direction and a plurality of sections in a direction at right angles thereto so folded in a pack that the whole surface of the map can be viewed in sections without opening the map to the extent of more than one section by successive folding about diagonals of square sections turning angularly and turning the pack upside down.

3. A map divided into rectangular sections and having a plurality of sections in one direction and a plurality of sections in a direction at right angles thereto; said sections being folded about their edges so that the crests of the folds are on the face of the map and about their diagonals so that the crests of the folds are on the back of the map and packed together by a combination of edge and diagonal folds so that the whole map comes successively into view by folding about a diagonal and turning angularly with turning upside down of the pack.

4. A map divided into square sections having two sections in one direction and three sections in a direction at right angles thereto, said sections being folded about their edges so that the crests of the folds are on the face of the map and about their diagonals so that the crests of the folds are on the back of the map and packed together by a combination of edge and diagonal folds so that the whole map comes successively into view by folding about a diagonal and turning angularly with turning upside down of the pack.

CHARLES GAUNTLETT HIGGINS.